(12) United States Patent
Mayer et al.

(10) Patent No.: US 11,325,318 B2
(45) Date of Patent: *May 10, 2022

(54) BONDING OBJECTS TOGETHER

(71) Applicant: Woodwelding AG, Stansstad (CH)

(72) Inventors: Jörg Mayer, Niederlenz (CH); Laurent Torriani, Lamboing (CH); Joakim Kvist, Nidau (CH); Patrick Mooser, Biel (CH)

(73) Assignee: WOODWELDING AG, Stansstad (CH)

( * ) Notice: Subject to any disclaimer, the term of this patent is extended or adjusted under 35 U.S.C. 154(b) by 46 days.

This patent is subject to a terminal disclaimer.

(21) Appl. No.: 16/500,525

(22) PCT Filed: Apr. 6, 2018

(86) PCT No.: PCT/EP2018/058850
§ 371 (c)(1),
(2) Date: Oct. 3, 2019

(87) PCT Pub. No.: WO2018/185279
PCT Pub. Date: Oct. 11, 2018

(65) Prior Publication Data
US 2021/0031461 A1 Feb. 4, 2021

(30) Foreign Application Priority Data
Apr. 6, 2017 (CH) ........................ 465/17

(51) Int. Cl.
*B29C 65/06* (2006.01)
*B29C 65/00* (2006.01)
*B29L 31/30* (2006.01)

(52) U.S. Cl.
CPC ........ *B29C 65/0672* (2013.01); *B29C 65/069* (2013.01); *B29C 66/7422* (2013.01); *B29C 66/74283* (2013.01); *B29L 2031/30* (2013.01)

(58) Field of Classification Search
CPC .............. B29C 65/0672; B29C 65/069; B29C 66/7422; B29C 66/74283; B29C 66/7392;
(Continued)

(56) References Cited

U.S. PATENT DOCUMENTS

| | | |
|---|---|---|
| 3,440,117 A | 4/1969 | Soloff et al. |
| 4,058,421 A | 11/1977 | Summo |
| 4,358,328 A | 11/1982 | Pearson |

(Continued)

FOREIGN PATENT DOCUMENTS

| | | |
|---|---|---|
| DE | 10 2013 001 943 | 3/2014 |
| DE | 10 2014 204 449 | 9/2015 |

(Continued)

OTHER PUBLICATIONS

Henning, Plastics Joining, Friction Welding Techniques, Feb. 1, 2001, http://www.ansatt.hig.no/henningj/materialteknologi/Lettvektdesign/joining%20methods/joining-welding-friction%20welding.htm. (Year: 2001).*

European Office Action dated Feb. 23, 2021, Application No. 18 714 539.6, 6 pages.

(Continued)

*Primary Examiner* — Michael N Orlando
*Assistant Examiner* — Christopher W Raimund
(74) *Attorney, Agent, or Firm* — Rankin, Hill & Clark LLP

(57) ABSTRACT

The relates to a method of mechanically securing a first object to a second object and includes the steps of: providing the first object including thermoplastic material in a solid state, providing the second object with a generally flat sheet portion having an edge, positioning the first object relative to the second object and bringing the first object and the second object to a relative movement to each other. The relative movement includes a rotational movement, such that a melting zone including flowable thermoplastic mate- (Continued)

rial is formed and such that thermoplastic material of the melting zone flows around the edge to at least partially embed the edge in the thermoplastic material. The invention further concerns a connector that is suitable for being used in a method according to the invention.

12 Claims, 7 Drawing Sheets

(58) Field of Classification Search
CPC .............. B29C 65/0636; B29C 65/645; B29C 66/21; B29C 66/30221; B29C 66/30223; B29C 66/30321; B29C 66/474; B29C 66/532; B29C 66/53241; B29C 66/72525; B29C 66/742; B29C 66/8322; B29C 65/0627; B29L 2031/30; B29L 2001/00; F16B 5/01; F16B 37/048; F16B 37/061
See application file for complete search history.

(56) References Cited

U.S. PATENT DOCUMENTS

| | | | |
|---|---|---|---|
| 10,562,233 B2* | 2/2020 | Mayer | B29C 66/7392 |
| 2010/0078115 A1* | 4/2010 | Lang | B29C 66/81435 |
| | | | 156/73.1 |
| 2017/0043525 A1* | 2/2017 | Wiethoff | B29C 66/7487 |

FOREIGN PATENT DOCUMENTS

| | | |
|---|---|---|
| WO | 2015/117253 | 8/2015 |
| WO | 2015/162029 | 10/2015 |

OTHER PUBLICATIONS

Switzerland Search Report dated Sep. 25, 2017, Application No. CH 4652017, 3 pages.
International Preliminary Report on Patentability dated Oct. 8, 2019 (Oct. 8, 2019), Application No. PCT/EP2018/058850, 8 pages.

\* cited by examiner

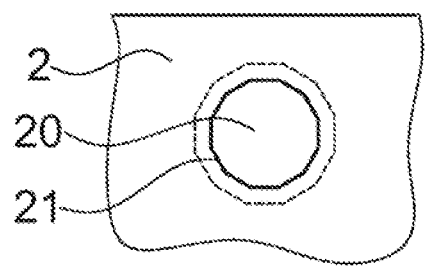
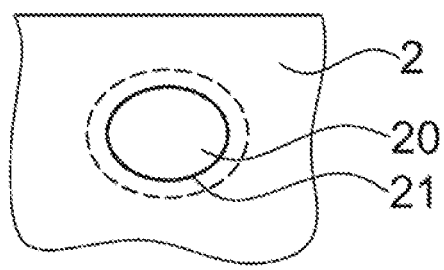
Fig. 7  Fig. 8
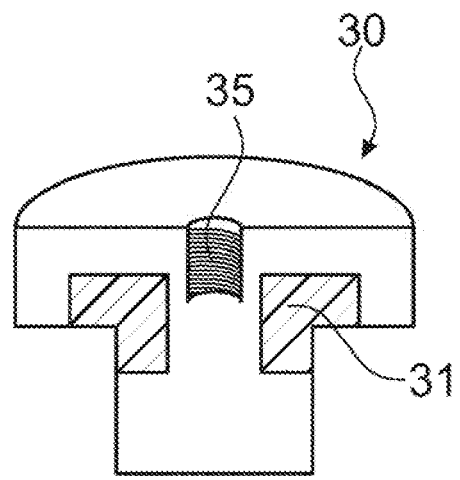
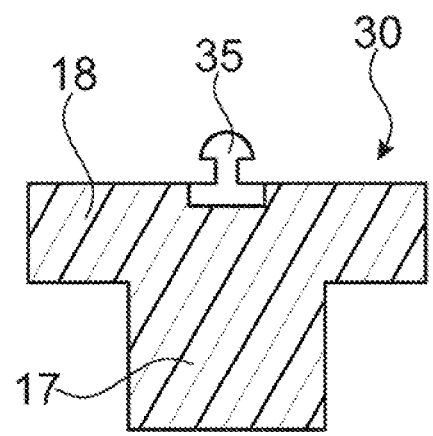
Fig. 9  Fig. 10
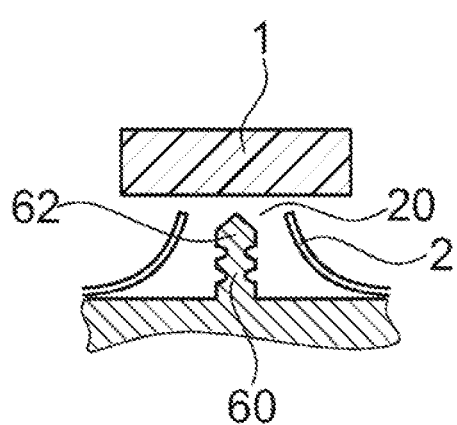
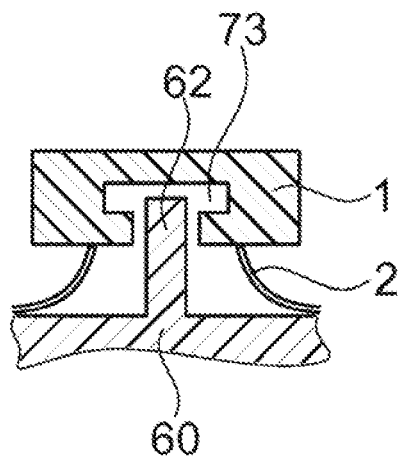
Fig. 12  Fig. 13

BONDING OBJECTS TOGETHER

BACKGROUND OF THE INVENTION

Field of the Invention

The invention is in the fields of mechanical engineering and construction, especially mechanical construction, for example automotive engineering, aircraft construction, railway industry, shipbuilding, machine construction, toy construction, building industries, etc. In particular, it relates to a method of—mechanically—securing a second object to a first object.

Description of Related Art

In the automotive, aviation and other industries, there has been a tendency to move away from steel-only constructions and to use lightweight material such as aluminum or magnesium metal sheets or polymers, such as carbon fiber reinforced polymers or glass fiber reinforced polymers or polymers without reinforcement, for example polyesters, polycarbonates, etc., instead.

The new materials cause new challenges in bonding elements of these materials—especially in bonding flattish object to another object. An example for this is the bonding of parts of polymer-based material to metal parts, such as metal sheets.

To meet these challenges, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, adhesive bonds may lead to a rise in manufacturing cost, both, because of material cost and because of delays caused in manufacturing processes due to slow hardening processes, especially if the surfaces to be connected to each other have certain roughness and as a consequence the quickly hardening thin-layer adhesives cannot be used. Further, a flattish adhesive bond between two objects not having the same coefficient of thermal expansion may lead to additional reliability problems as the adhesive bond may be subject to substantial shearing forces in everyday use due to temperature fluctuations.

A particular challenge when bonding elements to each other is the compensation of tolerances, for example if the elements are bonded to each other with other bonds than adhesive bonds, such as by screws and nuts or by rivets. In such bonds, a precise definition of the relative locations of a fastener and the respective fastening location is required. Such a precise definition may especially be hard to reach if a manufacturing process has to be particularly economical and/or if the parts to be connected are comparably large in at least one dimension and/or react to the conditions they are subject to during manufacturing and use in a different manner (for example if they have different coefficients of thermal expansion).

SUMMARY OF THE INVENTION

It is therefore an object of the present invention to provide a method of mechanically securing a second object to a first object, the method overcoming disadvantages of prior art methods. It is especially an object of the invention to provide a cost-efficient method that yields a reliable connection between a thermoplastic part and a part that is not liquefiable under the conditions, under which the thermoplastic part liquefies, or that yields a reliable connection between different parts by means of a thermoplastic connection element. It is another object of the invention to provide a method that yields a reliable connection between parts and is efficient and quick.

A method according to the invention is suitable for mechanically securing a first object to a second object and includes the steps of:

Providing the first object, wherein the first object includes thermoplastic material in a solid state.

For example, the first object can be or include a dowel, a connector, a plug, a sealing element, an anchor piece or fixation element for a further object, a plate or board having different physical, for example different mechanical, acoustical or optical properties, or chemical, for example resistance to liquids, properties etc.

Providing the second object with a generally flat sheet portion having an edge. The second object may be any object that has a flattish sheet portion. "Sheet portion" in this does not imply a necessarily homogeneous thickness. The second object may especially be a metal sheet. Alternatively, the second object may be another object having a sheet portion, for example a more complex object having a part of a metal sheet, which part constitutes the sheet portion, or an object in which a sheet portion is constituted not by a metal sheet in the narrow sense of the word (manufactured by rolling) but by a, for example, metallic part manufactured in a cast process, such as a die cast object. In an embodiment, the second object provided includes a perforation of the sheet portion, with the edge running along the perforation.

Positioning the first object relative to the second object to provide an assembly including the first and second object, in which assembly the edge is in contact with the thermoplastic material.

While the edge is in contact with the thermoplastic material, bringing the first object and the second object to a relative movement to each other such that a melting zone including flowable thermoplastic material is formed and such that thermoplastic material of the melting zone flows around the edge to at least partially embed the edge in the thermoplastic material.

In other words, the edge and—as the case may be—adjacent portions of the sheet portion form a securing location of the second object.

The melting zone is formed due to friction heat generated between the edge and the thermoplastic material that move relative to each other.

The relative movement is generated by an excitation applied to at least one of the first and second object.

In the method according to the invention, the relative movement includes a rotational movement.

In particular, the relative movement does not consist of a movement along a straight line, for example a proximal-to-distal axis of the first or second object or a longitudinal axis of the perforation, exclusively. The relative movement can be free of any oscillatory movement along such a straight line.

The relative movement can be free of any oscillatory movement.

In an embodiment, the contact between the edge and the thermoplastic material established in the step of positioning the first object relative to the second object defines a plane. In such an embodiment, a rotation axis of the rotational movement can be parallel to a normal of the plane.

However, the rotation axis can be defined differently, for example by a longitudinal axis of a bore or protrusion of at least one of the first and second object.

Further, one can also envisage an embodiment in which the rotation axis is not parallel to the normal of the plane. In such an embodiment, the melting zone is formed at a contact point between the first and second object and expands continuously in the following during the embedding of the edge in the thermoplastic material. However, an angle between the rotation axis and the normal can be limited due to the shape of the edge. For example, the edge can be formed by a protrusion of the second object. In such an embodiment, the angle can be such that the protrusion can penetrate into the thermoplastic material in a manner that allows the generation of the meting zone along a closed line and a full embedment of the edge in the thermoplastic material. The embodiment with the rotation axis not parallel to the normal of the plane leads to a good bonding of the first object to the second object when used in combination with an oscillating rotational movement, in particular.

In embodiments, the method further includes a step of applying a mechanical pressure force along an axial axis, in particular along the proximal-to-distal axis. In particular, the mechanical pressure force is such that it promotes the embedment of the edge in the thermoplastic material. The mechanical pressure force can be applied locally to the first or second object, wherein the object to which the pressure force is not applied locally is placed against a support, for example.

In any embodiment, the assembly can be held by the support during the step of applying the mechanical pressure force and/or the excitation.

The step of applying the mechanical pressure force can set in prior to or at the same time as the step of bringing the first and second object to a relative movement to each other.

A mechanical pressure force that sets in prior to the relative movement can be favourable in terms of bonding quality, in particular in terms of bonding depth and strength of the bonding generated.

In particular, the excitation can be applied from one, e.g., proximal, side of the assembly and the mechanical pressure force from an opposite, e.g., distal, side of the assembly.

In an embodiment, the excitation generating the rotational movement is applied from the proximal side of the assembly to the first object and the mechanical pressure force is applied from the distal side of the assembly to the second object.

Stopping the relative movement and letting the thermoplastic material resolidify to yield a positive-fit connection between the first and the second object.

The mechanical pressure force can last for a time sufficient for resolidification of the thermoplastic material after stopping the relative movement.

It is an advantage of the method including the use of the rotational movement for forming the melting zone compared to methods that include only axial, for example vibrational axial, movements, that axial joining forces can be reduced. This is because the friction heat is at least partly generated by the rotational movement. Hence, the method according to the invention is advantageous for a second object with low or reduced stiffness, such as a thin (e.g., steel or aluminium) sheet and/or for a second object including a sensitive surface, for example.

The second object provided can include a space on another side of the second object than the side from which the first object is brought into contact with it.

For example, in embodiments in which the first object is positioned from a proximal side to the second object and in which the first object is brought in the relative movement to the second object, a distal side may be free along the edge (thus, if applicable, around the perforation) so that the thermoplastic material can flow immediately along the surfaces of the second object's sheet portion.

The first and/or second object can include at least one energy director, i.e., the first and/or second object can have a surface profile that defines spots or areas at which the conditions for the melting of the thermoplastic material are favourable. The edge but also the tapered protrusions forming an expansion element discussed below are examples of energy directors.

In an embodiment, the rotational movement includes a rotational movement around a rotation axis, wherein the rotational movement includes a constant direction of rotation.

In particular, the rotational movement includes the constant direction of rotation for a relevant portion of a full turn around the rotation axis, for example a quarter of a full turn or a half turn, at least.

The constant direction of rotation is either clockwise or counterclockwise. One can also envisage that the relative movement is either clockwise or counterclockwise, but it is not clockwise for a short period of time and counterclockwise for another short period of time. In particular, it is not an oscillation rotational movement.

In this embodiment, the rotational movement can be given by its rotation speed, given in turns per second, for example.

The rotation speed can be adjusted during the method.

The rotation speed or the range of rotation speed used in the method can depend on the first and second object, in particular on their composition and dimensions.

In particular, the rotational movement can be, i.e., can consist of, the rotational movement with constant direction of rotation around the rotation axis.

Alternatively, the rotational movement includes the oscillating rotational movement. In other words; the relative movement includes a back and forth oscillating rotation around the rotation axis, i.e., it switches between a clockwise or counterclockwise rotation.

In particular, the oscillating rotational movement can be characterized by a frequency and an amplitude, wherein the amplitude can be given in radians.

The frequency and/or amplitude can be adjusted during the method.

The frequency and/or amplitude or the frequency range and/or amplitude range used in the method can depend on the first and second object, in particular on their composition and dimensions.

In particular, the rotational movement can be, i.e., can consist of, the oscillating rotational movement around the rotation axis.

In an embodiment, the rotational movement includes an orbital movement.

The rotational movement can be, i.e., can consist of, the orbital movement. However, an orbital movement in combination with a rotational movement including a constant direction of rotation or in combination with an oscillating rotational movement can be envisaged.

In particular, the orbital movement is an orbital movement around a central axis.

The central axis can be normal to the plane defined by the contact between the edge and the thermoplastic material established in the step of positioning the first object relative to the second object.

The central axis can be a longitudinal axis of the perforation, for example.

It is an advantage of the embodiment including an orbital movement that the contact between the first and second object generated does not need to be rotationally symmetric with respect to the rotation axis of the first and/or second object.

In a sub-group of the embodiment including the orbital movement and further including the perforation forming the edge, the orbital movement is such that a radial extension of the melting zone is smaller than 0.5 times a diameter of the perforation, in particular smaller than 0.2 times the diameter, for example between 0.1 and 0.2 times the diameter. A melting zone with such a radial extension is advantageous in terms of a well-controllable bonding process.

In particular, a cross-section of the perforation normal the longitudinal axis of the perforation and/or normal to a rotation axis of the first or second object does not need to be circular, anymore. For example, the cross-section can be elliptic or have a 4-fold or higher, for example 6- or 8-fold, rotation symmetry with respect to the longitudinal axis or rotation axis. In particular a 12-fold or higher rotation symmetry can be advantageous in terms of creating a melting zone in a method according to the invention.

The cross-section with n-fold rotation symmetry can include straight segments, bent segments or a combination of straight and bent segments.

In an embodiment, the first object is brought into contact with the second object from a generally proximal side in the step of positioning. In addition, along the edge a space distally of the second object can be free before the flow portion becomes flowable.

In an embodiment, the first object is brought into contact with the second object from a generally proximal side in the step of positioning, and the step of bringing the first and second object to a relative movement to each other includes coupling a tool to a proximally facing coupling face of the first object, whereby a pressing force in a distal direction, i.e., towards the second object, and the rotational movement are coupled into the first object by the tool, simultaneously.

In an embodiment, at least one of the first object provided and the second object provided includes a coupling-in face. Further, a method according to this embodiment includes the step of providing a tool including a coupling-out face, wherein the coupling-out face is arranged to engage with the coupling-in face. Further, the tool is equipped to generate an excitation capable to set an object engaged to the tool by use of the coupling-out face in the rotational movement.

In particular, it is the object that is set in movement relative to the other object that includes the coupling-in face.

The method can include the step of bringing the coupling-out face in contact with the coupling-in face. This can be done prior to the step of bringing the first and second object to a relative movement to each other or it can be done prior to the step of positioning the first object relative to the second object, for example. In particular, the first or second object can be provided in a manner engaged to the tool.

In particular, the coupling-out face and the coupling-in face as well as the resulting engagement is such that the excitation and—as the case may be—the mechanical pressure force can be transferred to the object engaged.

In any embodiment including a tool, a distal end of the tool can be adapted to the shape of the edge such that the tool does not slide laterally relative to the assembly. This means that the coupling face between the sonotrode and the first object can be restricted to a region tailored to the shape of the second object and to the location of the edge. For example, the coupling-out face may be restricted to a lane following the course of the edge of the second object. In embodiments with a perforation along which the edge is formed, the coupling face can be ring shaped with a central opening, for example.

In embodiments having a perforation, the sheet portion around the perforation has a projecting ("deformed") section projecting away from a sheet plane. The projection can be towards the first object, i.e., towards proximally if the rotational movement is coupled into the first object, or away from the first object, i.e., towards distally.

For example, the projecting (deformed) section includes a plurality of tongues, wherein the edge is constituted by end edges of the tongues.

Such tongues, or rather the gaps between the tongues, increase the torsional strength of the element including the first object secured to the second object by the method.

An increase of torsional strength by the use of tongues, in particular by the use of tongues formed by the sheet portion, is made possible by the method including the rotational movement. This is because the method including the rotational movement guarantees the generation of sufficient friction heat for forming the melting zone even when a significantly lower mechanical pressure force is applied to the assembly including the first and second object compared to a method that bases predominantly on vibrational axial, movements. Methods that base predominantly on axial movements are difficult to use for the increase of torsional strength by the use of tongues due to a limited axial stiffness of the tongues.

In particular, the use of the oscillating rotational movement is advantageous for the embodiment including a projecting (deformed) sheet portion including the plurality of tongues. For example, the method of mechanically securing the first object to the second object becomes a better controllable process due to the oscillating rotational movement. Moreover, it has been found that an amplitude of the oscillating rotational movement that is smaller than the gap between the tongues, this means the number of radians over which the gap extends, is advantageous in terms of press control and load on the tongues. Especially, if the amplitude of the oscillating rotational movement is smaller than the gap between the tongues, in the first object a polymer bridge between the tongues may remain solid, and liquefaction of such bridge may be prevented.

More generally, the use of the method including the rotational movement for generating the melting zone allows for usage of the method for second objects that are of limited stability, in particular limited axial stability, at a securing location.

The projecting (deformed) section can run continuously around a periphery of the perforation.

In embodiments, the sheet portion along the edge (thus if applicable around the perforation) is deformed so that the sheet portion projects away from a sheet plane defined. In other words: The sheet portion along the edge has a section projecting away from the sheet plane. Especially, the sheet portion may project towards the side of the first object (towards the proximal side in embodiments in which the rotational movement is coupled into the first object from a generally proximal side). Especially, the projecting section (if any) being a deformed section may be of a same metal sheet material as the sheet portion.

In this text, the term "sheet plane" denotes the plane/surface defined by the shape of the generally planar sheet portion in a region around the edge, especially around the perforation (if any). The sheet plane may be planar in the sense of extending straight into two dimensions. Alternatively, the sheet plane may be curved and thereby follow a more complex 3D shape, for example if it constitutes the surface of a complex object, such as a body of a vehicle or aircraft. In case the second object is, near the edge, deformed to project away from the sheet plane, the curvature of second object at the location from where the deformed section extends will often be much larger than the curvature of the sheet plane.

Such a deformed section may be formed by deforming a corresponding part of the sheet portion, for example by making a cut (for example by punching) and bending or otherwise deforming hence leaving a second element opening where the corresponding part of the sheet portion had initially been. In this, the deformed section may still be one-piece with the sheet section.

As an alternative to a deformed section, would also be possible to provide a section of the sheet portion that projects away from the sheet plane as a separate element secured to the sheet material, for example by welding.

As an even further alternative to a deformed section, it would be possible to manufacture a section projecting towards the side from which the first object is brought into contact, which section ends in the edge, by an ab-initio shaping process, such as by die casting or pressing or injection molding (followed by well-known subsequent processing steps) if the named section is of ceramic. In such embodiments, the sheet portion may even consist of the portion that projects towards the first object and/or the section that after the process is embedded in the flow portion i.e., there is no need to have a sheet plane that is further defined by the sheet portion.

In embodiments with a perforation and with a projecting (for example deformed) section around the perforation, the deformed section may be symmetrical, i.e., may be deformed uniformly around the perforation (this includes the possibility that the deformed section has a rough edge, for example with a sawtooth-like shape). Especially, it may be symmetrical with respect to rotation around an axis perpendicular to a sheet plane through a center of the perforation.

Alternatively, it may be asymmetrical with respect to rotation around the axis in that the height (average height in case of a rough/toothed edge) of the projecting section differs as a function of the position along the edge. In such embodiments, the asymmetry may even be such that the projecting section does not extend all around the perforation but along some segment of the edge there is no such projecting section. In this case, however, the projecting section may extend around at least 180° of the periphery so as to lock the first and second objects to each other with respect to all in-plane relative forces.

The method may include the further step of manufacturing a perforation in the second object prior to the step of positioning, for example by punching, drilling, etc. Alternatively, the perforation along which the edge is formed in embodiments may be an opening that exists in the second object anyway or has been provided in a manufacturing process.

The perforation can be generated by laser cutting.

In particular when the perforation is generated by laser cutting, the sheet portion can be cut in a manner that an undercut is formed. Such an undercut can lead to a positive-fit connection between the first object and the second object which is in addition or alternatively to the positive-fit connection based on the overall shape of the second object, in particular of the sheet portion. In any case, the positive-fit connection resulting from such an undercut can increase the pull-out resistance of the first object secured to the second object by the method.

In embodiments in which the perforation includes the projecting (protruding/deformed) section that forms the edge by its distal or proximal end, the protruding section can form the portion of the overall shape of the second object that contributes to the corresponding positive-fit connection. The protruding section can then be laser cut in a manner that the undercut is formed, wherein the undercut leads to a positive-fit connection that is in addition to the positive-fit connection resulting from the overall shape of the second object.

The envisaged pull-out resistance can be realized by designing the undercut and the undercut formed by the overall shape of the sheet portion, for example of the tongues.

The use of laser cutting for manufacturing the perforation allows for the design of undercuts of various shapes. In particular, the use of laser cutting for manufacturing tongues allows for various designs that are not producible by conventional manufacturing techniques such as punching, drilling etc.

Thereby, there is no need that the designs of the tongues generate a high stability under pressure, in particular a high axial stability, due to the use of the rotational movement for generating the melting zone requiring axial pressure only to advance the tongues into the melt.

For example, one can envisage tongues that have a lateral extension that varies in dependence of the distance from the sheet plane, this means in dependence of the axial position. Thereby, a sequence including a region with a first lateral extension and a region with a second lateral extension that differs from the first lateral extension can form the undercut.

For example, the tongues can include a bridge-like connection to the portion of the second object that form the sheet plane. In this case, the undercut is formed at the bending edge where the tongues bent away from the portion of the second object that form the sheet plane.

In an embodiment, the second object provided includes a main perforation, with the edge running along the main perforation, and a plurality of peripheral perforations being distributed along a periphery of the main perforation.

Such peripheral perforations have the effects of enhancing the footprint of the connection, of providing an additional securing against rotation, and of reducing the resistance during the process by providing further flow channels.

In particular, the peripheral perforations are smaller than the main perforation.

The main perforation can be approximately round.

The sheet portion of the second object provided can have, around the main perforation, a protruding section projecting away from a sheet plane towards a contact side, wherein the peripheral perforations can be at least partially arranged in the protruding section.

In an embodiment, the first object provided, extends along a first object axis between a proximal surface of the first object and a distal surface of the first object and includes a protrusion protruding distally from the distal surface. In such an embodiment, the method includes the further step of pushing at least a portion of the protrusion into the perforation such that the edge is in contact with at least one of a portion of a surface of the protrusion that is arranged parallel to the first object axis and a portion of the distal surface of the first object.

The first object provided can have a head portion arranged proximally of the protrusion. Hence, the head portion forms the distal and proximal surface of the first object at least partly.

If the first object provided includes the protrusion and the head portion, the step of pushing at least a portion of the protrusion into the perforation can include pushing the protrusion into the perforation such that the distal surface formed by the head portion is in contact with the edge. Hence, the melting zone formed during the step of bringing the first and second object to a relative movement to each other is formed at a distal side of the head portion.

Embodiments including the step of pushing at least a portion of the protrusion into the perforation can further include the step of expanding radially the portion of the protrusion that is pushed or has been pushed into the perforation such that the radially expanded protrusion expands beyond the edge of the perforation. In other words: the protrusion is expanded such that it cannot be pulled out of the perforation after the step of expanding radially, anymore.

In particular, the radial expansion is a radial expansion with respect to the first object axis.

This means that the expanded protrusion forms a positive-fit connection in a direction parallel to the first object axis. The positive-fit connection can be a positive-fit connection in addition to the positive-fit connection formed by thermoplastic material of the melting zone that flows around the edge to at least partially embed the edge in the thermoplastic material and the edge.

The step of expanding radially the portion of the protrusion can be applied during or after the step of pushing at least a portion of the protrusion into the perforation.

The radial expansion of the protrusion can include a collapse of the protrusion.

Embodiments including the step of expanding radially the portion of the protrusion that is pushed or has been pushed into the perforation can further include at least one of:

A step of spinning the first object such that flowable thermoplastic material expands radially due to centrifugal force.

In the step of providing the second object, the second object includes a distal surface and the method includes the step of bringing a distal portion of the first object, in particular a distal end of the protrusion, in contact with a rear side of the distal surface and the step of deforming the distal portion of the first object.

In particular, the distal surface has a mechanically stability such that the distal portion of the first object can be deformed by pressing it against the distal surface. The deformation can include making the distal portion of the first object flowable, for example by bringing the first and second object to a relative movement to each other. For example, the second object provided is a layered board, such as a sandwich panel (sandwich board), in particular a composite sandwich panel including two face sheets and a honeycomb core (sometimes called "hollow core board" or HCB).

The distal surface of the second object provided and/or the distal portion of the first object provided can include an expansion element. In the case of the distal surface, the expansion element can have the shape of a tapered protrusion, for example. In the case of the distal portion, the expansion element can have the shape of a slot, for example. Hence, the protrusion can be slotted.

The distal surface of the second object provided and/or the distal portion of the first object can include an energy director.

One can also envisage that the protrusion penetrates the distal surface of the second object (that does not need to have the mechanically stability in this case) and the method includes the step of providing an anvil. Then, the distal portion of the first object is expanded radially by being pressed against the anvil. Anvil and/or distal portion can have an expansion element and/or an energy director as described. The anvil can further have a head forming recess in a proximal surface. The expansion element can be arranged in the head forming recess.

A step of providing a tool comprising:
a counterelement arranged or arrangable distally of the first object, in particular distally of the distal end of the protrusion, wherein the counterelement can be moved along the first object axis in a proximal direction by applying a pushing force to the counterelement, and comprising
a coupling-out face arrange or arrangable at the proximal surface of the first object, for example to a coupling-in face of the first object (if present), wherein a pressing force can be applied to the first object via the coupling-out face.

The counterelement and the coupling-out face are arranged such that a compression force can be applied to the first object. This means that the tool is equipped to compress at least a portion of the first object during the step of bringing the first and second object to a relative movement to each other.

The portion compressed is the protrusion, in particular.

Expansion of the portion of the protrusion that is pushed or has been pushed into the perforation can include making the protrusion at least partly flowable, for example by bringing the first and second object to a relative movement to each other.

In particular, the protrusion is made flowable at an interface between a distal end of the protrusion and the counterelement.

The counterelement and/or protrusion can include an expansion element and/or an energy director as described above.

Each feature of the tool provided in an embodiment of the method including the step of expanding radially the portion of the protrusion that is pushed or has been pushed into the perforation can be in addition to any other feature of a tool provided in any other embodiment of the method.

In an embodiment, the second object, in particular a region around the edge, is pretensioned in a manner that the edge penetrates into the flowable thermoplastic material that is formed during the step of bringing the first object to a relative movement to the second object.

The edge can penetrate into the flowable thermoplastic material during the step of pushing the first object into the perforation or the first object can be pushed into the perforation without generation of a melting zone in a first step followed by step of bringing the first object and the second object to a relative movement to each other such that the melting zone is formed. In other words: the first object can be pushed into the perforation during the relative movement or prior to the relative movement.

In particular, the second object includes the protruding section including the edge, wherein the protruding section protrudes in a distal direction and the first object is pushed into the perforation from a proximal direction.

The pretension can be a static pretension.

The pretension can be generated by an elastic deformation of the second object, in particular of the region around the edge.

For example, in embodiments including providing a second object with a perforation, providing a first object including a protrusion, and the step of pushing at least a portion of the protrusion into the perforation, a diameter of the protrusion can be larger than a diameter of the perforation. In such an embodiment, the step of pushing at least a portion of the protrusion into the perforation can be carried out prior to the step of bringing the first and second object to a relative movement to each other, i.e., prior to forming the melting zone. Hence, a static pretension is generated in the second object by deforming it, in particular deforming it elastically, during the step of pushing. The pretension causes the edge to penetrate into the flowable thermoplastic material formed during the step of bringing the first object to a relative movement to the second object.

In this embodiment, the method includes the steps of: (1) pushing at least a portion of the protrusion into the perforation and (2) bringing the first and second object to a relative movement to each other such that a melting zone including flowable thermoplastic material is formed, wherein the step of pushing is applied prior to the step of bringing the first and second object to a relative movement to each other.

In particular, the edge is in contact with at least a portion of the surface of the protrusion that is arranged parallel to the first object axis. Hence, the pretension is essentially along an axis perpendicular to the first object axis and/or the edge penetrates a side but not the distal end of the protrusion.

In particular, the edge is formed by the deformed section, wherein the deformed section projects distally away from a sheet plane.

The deformed section is elastically deformable or includes spring-back properties.

The first object, in particular its protrusion, can be tapered and/or include lateral grooves.

The penetration of the edge into the first object can be promoted further by at least one of:
  Proving a second object that includes spring-back properties around the protrusion, for example by including leaflets, flaps, wings or tongues.
  Providing a second object including slots, wherein the slots are arranged radially with respect to the perforation.
    Radial slots (slits) are preferable in combination with orbital movements, in particular.
  Providing a second object including a material around the protrusion at least that this elastically deformable.

Especially in embodiments including a pretension of the region around the edge—but not only in such embodiments—, the protruding section can include at least one hole in addition to the perforation. Such a hole increases the stability of the connection generated between the first and second object, in particular the stability against rotational movements along an axis parallel to the longitudinal axis of the perforation.

The first object and the connection to the second object may in embodiments be such as to seal the perforation off, i.e., to seal a region proximally of the second object from a region distally thereof. In other words: The first object can be configured to seal a proximal side of the second object from a distal side of the first or second object by sealingly closing off the perforation. To this end, the first object may for example have a continuous body extending to the periphery, which periphery embeds the edge.

In particular, the first object provided can be watertight.

In the method according to any embodiment, the first object provided can include at least one of:
  A body of a not liquefiable material in addition to the thermoplastic material. Such a body of not liquefiable material may constitute a reinforcer portion of the first object. In particular, the step of bringing the first and second object to a relative movement to each other is carried out such that during the step of causing the flow portion to re-solidify, the body extends through a plane defined by the edge.
    However, the first object can consist of thermoplastic material, in embodiments. In embodiments with a not liquefiable body, the body of the not liquefiable material is different from a mere filler of a large number of particles but is a macroscopic body with a defined position and orientation and of a substantial size. In a sheet plane defined by the second object, the size may be for example at least 10% of first object average diameter (of a cross section perpendicular to the insertion axis) or, if applicable, of a perforation average diameter, and/or a characteristic dimension may be at least 0.1 mm in any dimension. Especially, the body may be metallic or of ceramics. Especially, the body may be such as to have a defined shape and to thereby add stiffness to the first object. By the body, the first object is defined into at least two spatially separated regions, namely the body region and the thermoplastic region. In embodiments in which the first object in addition to the thermoplastic material includes not liquefiable material, the thermoplastic material may be arranged at least on surface portions that come into contact with the edge.
  A fixation element for fastening a further object to the first and/or second object.
    In particular, the fixation element can include a fastening structure. A thread, a threaded bar, a nut, an element of a plug connection, snap lock, or bayonet lock are examples of fastening structures.
    The first object can be the fixation element by including the fastening structure.
    The first object can carry the fixation element including the fastening structure. In such embodiments, the first object may be viewed as a fastener—or anchor—for the further object. In alternative embodiments, the first object may itself constitute an object having a function different from being a mere fastener, e.g., based on different physical and/or chemical properties as mentioned.

The invention moreover concerns a connector that is a first object according to any embodiment described in this text. Hence, such a connector is suitable for being used in the method according to any embodiment.

The connector:
Includes thermoplastic material in a solid state at least at an attachment location.
The connector is capable of being secured to a second object that has a generally flat sheet portion having an edge, by a method that includes bringing the connector to a relative movement to the second object while the attachment location and the second object are pressed against each other, until a flow portion of the thermoplastic material due to friction heat generated between the edge and the thermoplastic material becomes flowable and flows around the edge to at least partially embed the edge in the thermoplastic material, wherein the relative movement includes a rotational movement;
In particular, the rotational movement is at least one of a rotational movement with a constant direction of rotation around a rotation axis, an oscillating rotational movement around a rotation axis, and an orbital movement.
The connector further includes a fastening structure equipped for cooperating with a fastening structure of a further object to secure the further object to the connector and to thereby connect the further object to the second object.
A thread, a threaded bar, a nut, an element of a plug connection, snap lock, or bayonet lock are examples of fastening structures.

In an embodiment, the connector includes a portion different from the attachment location, the portion being equipped to expand radially with respect to a connector axis.

In particular, the connector can include a head portion and a protrusion that is pushed through a perforation of the second object. The portion can be part of the protrusion.

Generally, the connector axis corresponds to the first object axis.

For example, the portion can include an expansion element, in particular an expansion element of the first object as described above, or it can consist of it.

Alternatively, the portion is arranged to become flowable when spun around a rotation axis, such that the portion expands due to the centrifugal force. For getting flowable, the portion can be in contact with and/or pressed against a surface of the second object at least partly.

In this text the expression "thermoplastic material being capable of being made flowable", in particular by the relative movement or in short "liquefiable thermoplastic material" or "liquefiable material" or "thermoplastic" is used for describing a material including at least one thermoplastic component, which material becomes liquid (flowable) when heated, in particular when heated through friction i.e., when arranged at one of a pair of surfaces (contact faces) being in contact with each other and moved relative to each other.

In some situations, for example if the first object itself has to carry substantial loads, it may be advantageous if the material has an elasticity coefficient of more than 0.5 GPa. In other embodiments, the elasticity coefficient may be below this value.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g., fibers or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the first object is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature" in this text) is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, non-liquefiable material may be a metal, such as aluminium or steel, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride (PVC), polyethylene, polypropylene, and polystyrene, or copolymers or mixtures of these.

In embodiments in which both, the first and the second object include thermoplastic material and no welding is desired, the material pairing is chosen such that the melting temperature of the second object material is substantially higher than the melting temperature of the first object material, for example higher by at least 50°. Suitable material pairings are, for example, polycarbonate or PBT for the first object and PEEK for the second object.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g., mullite, silicon carbide or silicon nitride, high-strength polyethylene (Dyneema), etc.

Other fillers, not having the shapes of fibers, are also possible, for example powder particles.

In this text, the terms "proximal" and "distal" are used to refer to directions and locations, namely "proximal" is the side of the bond or assembly from which an operator or machine applies the excitation capable to generate the rotational movement of the first or second object, whereas distal is the opposite side. A broadening of the connector on the proximal side in this text is called "head portion", whereas a broadening at the distal side is the "foot portion".

Hereinafter, embodiments of the invention are described referring to drawings. The drawings are all schematical and not to scale. In the drawings, same reference numbers refer to same or analogous elements. The drawings are used to explain the invention and embodiments thereof and are not meant to restrict the scope of the invention. Terms designating the orientation like "proximal", "distal", etc. are used in the same way for all embodiments and drawings.

BRIEF DESCRIPTION OF THE DRAWINGS

The drawings show:

FIGS. 7 and 8 yet two alternative embodiments of the second object that are suitable in combination with an orbital movement, in particular;

FIGS. 9 and 10 two exemplary embodiment of a connector:

FIGS. 12 and 13 further configurations for securing a third object, the second object and the first object to each other;

DETAILED DESCRIPTION OF THE INVENTION

FIGS. 1a-1d show an embodiment of the method of mechanically securing a first object 1 to a second object 2.

Figure 1A:
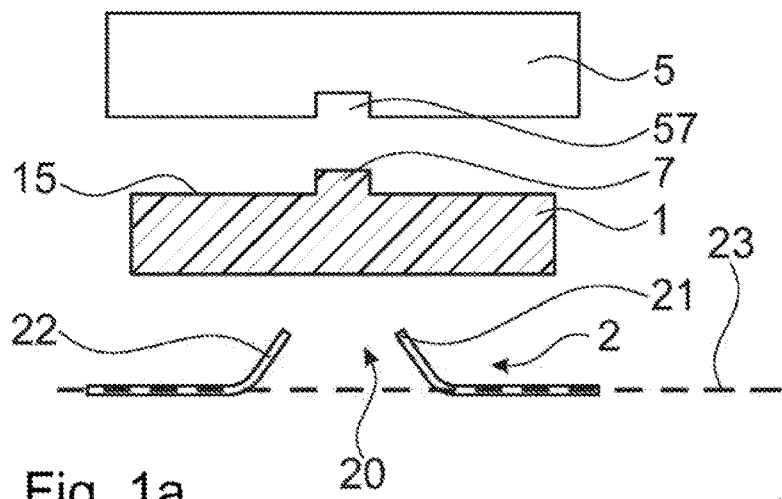
FIGS. 1a-1d a schematic visualization of an embodiment of the method for mechanically securing a first object to a second object.

FIG. 1a shows the first object 1 provided, the second object provided 2 as well as a tool 5 that is capable to generate a rotational movement and to transfer the rotational movement to at least one of the first and second object.

The first object 1 shown consists of thermoplastic material. However, this is not a requirement for the method claimed. For example, the first object 1 can include a fastening structure for fastening or attaching a further object to the first and/or second object. In particular such a fastening structure can include or be made of a material different from a thermoplastic material.

The first object 1 shown includes a coupling-in face 7 arranged to engage with the tool 5. In the embodiment shown, the coupling-in face 7 is arranged on a proximal surface 15 of the first object 1. The tool 5 includes a corresponding coupling-out face 57 arranged to engage with the coupling-in face 7 such that the first object 1 is coupled to the tool 5 in a manner that allows for a transfer of the rotational movement generated by the tool 5 to the first object 1.

Figure 3A:
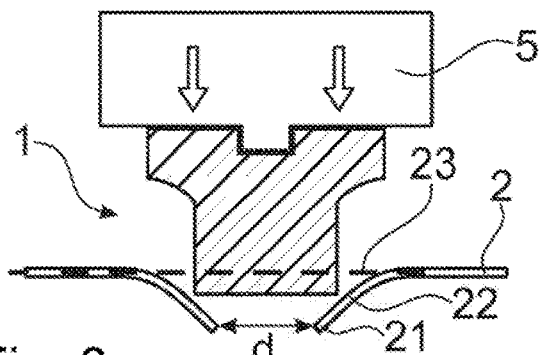
FIGS. 3a-3c an embodiment including a step of generating a pretension in the second object.
Figure 3B:
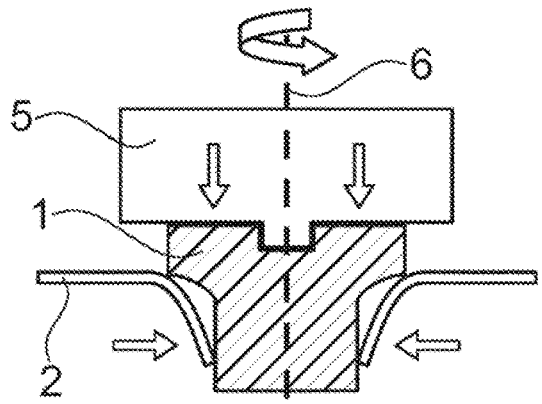
Figure 3C:
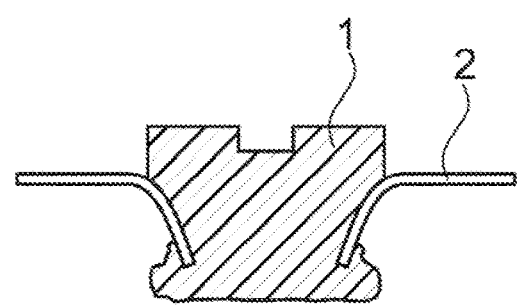

The second object 2 shown in FIG. 1a is metal sheet including a perforation 20 and an edge 21 running along the perforation 20. In the shown embodiment of the second object 2, the edge 21 is formed by a protruding section 22 that projects away from a sheet plane 23. In the embodiment shown, the protruding section 22 projects towards the first object 1. However, this is no general requirement, as FIGS. 3a-3c show, for example.

Figure 1B:
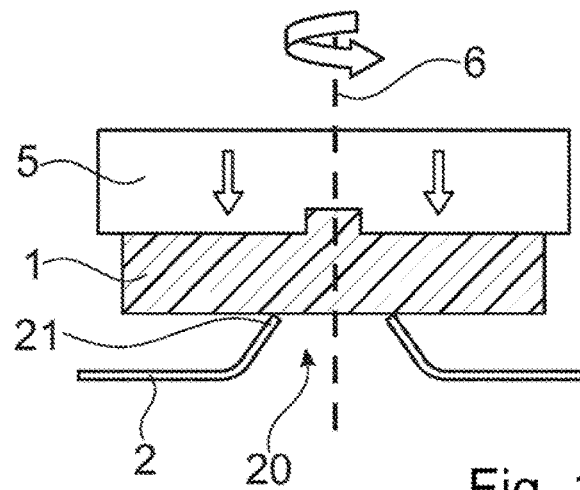

FIG. 1b shows the situation at the beginning of securing the first object 1 to the second object 2, i.e., after a step of positioning the first object 1 relative to the second object 2 such that the edge 21 is in contact with the thermoplastic material and after engaging the first object 1 to the tool 5.

The first object 1 is rotated around a rotation axis 6 (indicated in the figure by a curved arrow), whereas the second object 2 is fixed such that it does not rotate. Further, the first object 1 is pressed against the second object 2 (indicated in the figure by straight arrows).

Figure 1C:
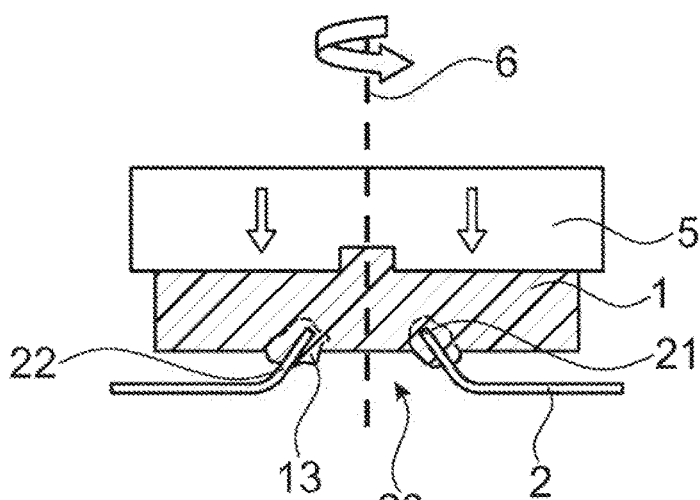

Friction heat is generated at the contact points or contact area between the edge 21 and the thermoplastic material. The friction heat generates a melting zone 13 such that the first object 1 can be moved in a translatory movement towards the second object 2. The translatory movement is accompanied by an embedment of the edge 21 in the thermoplastic material. This situation is shown in FIG. 1c.

Figure 1D:
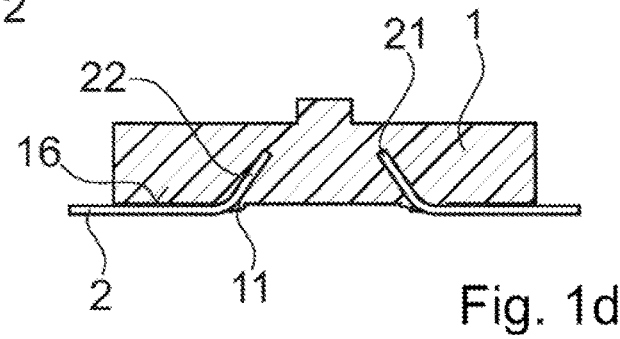

FIG. 1d shows the situation after having carried out the method, i.e., it shows the first object 1 mechanically secured to the second object 2. The embedded protruding section 22, in particular the embedded edge 21, and the thermoplastic material form a positive-fit connection in both a horizontal and vertical direction.

In the embodiment shown, the pressing force is applied until a further translatory movement of the first object 1 is stopped by a portion of a distal surface 16 the first object 1 lying flatly on a proximal surface of the second object 2. In other words: The step of applying mechanical pressure may be carried out until abutting surface portions of the first and second objects lie against each other.

Figure 2A:
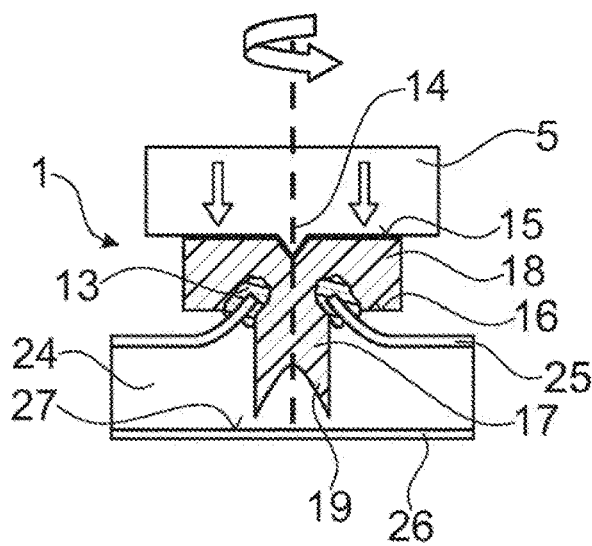
FIGS. 2a and 2b an embodiment including a first object with a protrusion and a sandwich panel as second object.
Figure 2B:
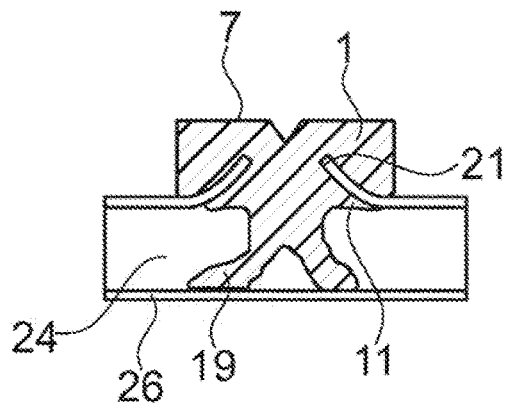

FIGS. 2a and 2b show an embodiment of the method including a first object 1 with a head portion 18 and a protrusion 17 that protrudes distally from the distal surface 16 of the first object and a second object 2 including a proximal face sheet 25 and a distal face sheet 26.

Hence, the second object 2 can include a shell structure as used in the automotive industry, for example. In particular, the second object 2 can include a metal sheet shell structure, i.e., the proximal and distal face sheet are metal sheets.

Figure 18:
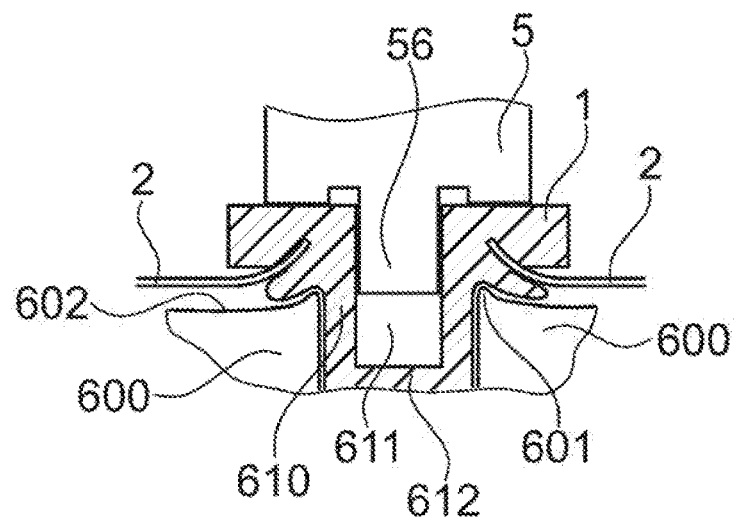
FIG. 18 a configurations with an anvil.
Figure 19A:
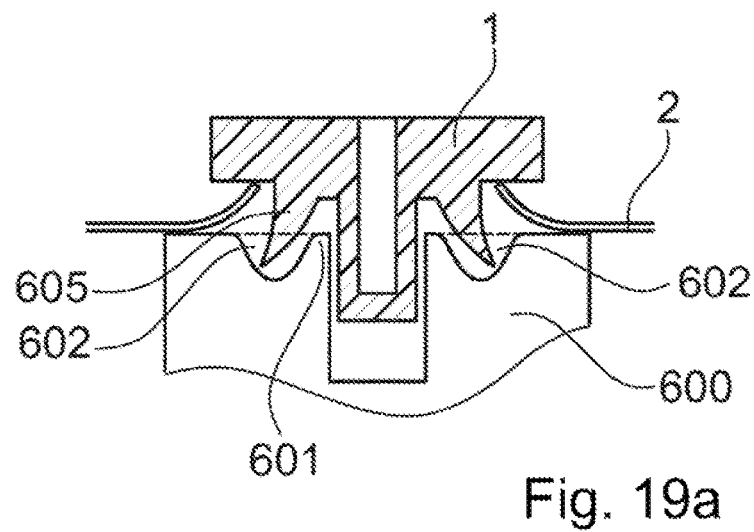
FIGS. 19a and 19b another configuration with an anvil in an initial and a final stage, respectively.
Figure 19B:
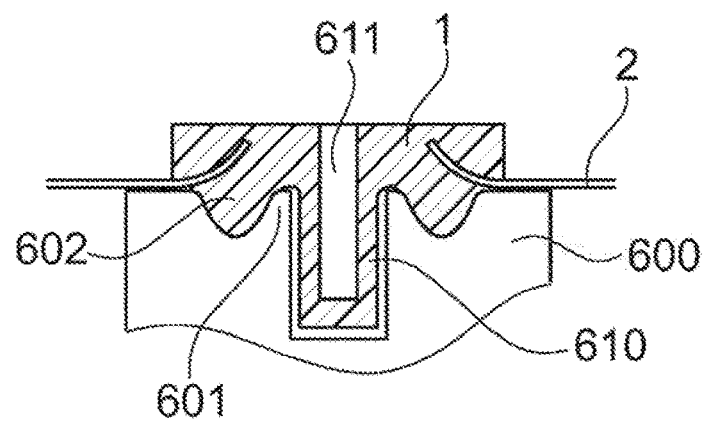

In embodiments including an anvil, the distal face sheet 26 can be replaced by the anvil. This is shown in FIGS. 18, 19a and 19b, for example.

In the embodiment shown in FIGS. 2a and 2b, the second object 2 includes further a core 24. The core 24 can be a honeycomb core, for example.

FIG. 2a shows the situation during the step of rotational and translatory movement of the first object 1 relative to the second object 2, i.e., after pushing the protrusion 17 into the perforation 20. In the embodiment shown, the dimensions of the perforation 20 is such that the protrusion 17 can be pushed through the perforation 20 completely, this means such that the distal surface 16 of first object, i.e., the head portion 18, is in contact with the edge 21. Due to this configuration of perforation 20 and protrusion 17, the melting zone 13 is generated in the head portion 18.

The first object 1 shown in FIGS. 2a and 2b includes the optional feature of an expansion element 19. In the shown embodiment, the expansion element 19 forms a distal end of the protrusion 17. The expansion element 19 is such that a deformation causing a radial expansion of the protrusion with respect to a first object axis 14 due to a force compressing the protrusion 17 is favourable.

In the embodiment shown, the first object axis 14 corresponds to the rotation axis 6 and the axis along which the protrusion 17 is pushed through the perforation 20.

In the embodiment shown, the expansion element 19 has the shape of a two tapered protrusions.

Independent of the specific shape of the expansion element 19, the expansion element 19 can be formed such that it is in contact with the distal face sheet 26 along a line or a contact area, the contact area being small compared to a radial extension of the protrusion 17. In the embodiment shown in FIG. 2a, this means that the expansion element 19 extends along an axis that is normal to the drawing plane.

A contact along a line or a the contact area can be advantageous in terms of local load on the distal face sheet 26.

The dimension of the first object 1 is such that the expansion element 19 gets in contact with the distal face sheet 26 before a further translatory movement of the first object 1 is prevented by the distal surface 16 lying flatly on the proximal face sheet 25.

Hence, the first object 1, in particular the protrusion 17, is compressed between the tool 5 and the distal face sheet 26, resulting in a deformation of the expansion element 19 where in contact with the distal face sheet 26 due the pressure force applied.

In the embodiment shown, the deformation includes that at least a portion of the deformation element 19 becomes flowable due to the friction heat generated by the rotational movement of the first object 1 relative to the second object and the pressing force applied. In embodiments in which the second object 2 includes a core 24, the flowable portion penetrates into structures, such as pores, voids and openings, of the second object, in particular the core 24 and/or the distal face sheet 26.

In embodiments in which the second object 2 includes the shell structure or in which the anvil is used instead of the distal face sheet 26, the deformation is such that the distal embedding of the edge 21 and the sheet portion around the edge is improved, in particular by expanding the radial extension of the protrusion 17 in a region located immediately distally of the edge 21. This means that an embedment comparable to the embedment shown in FIG. 4b is established. In particular, the deformation is such that the distal side of the edge and the sheet portion around the edge forms a positive fit connection with the thermoplastic material after the step of letting the thermoplastic material resolidify.

An expansion of the radial extension of the protrusion 17 in the region located immediately distally of the edge 21 can further improve the tightness of the bond formed.

FIG. 2b shows the first object 1 mechanically secured to the second object 2. Besides the positive-fit connection formed by the protruding section 22, in particular the edge 21, embedded in the resolidified thermoplastic material, there is a second positive-fit connection formed by the deformed expansion element 19 and the core and—as the casa may be—the distal face sheet 26.

FIGS. 3a-3c shows an embodiment of the method including the generation of a pretension in the second object 2 that contributes to a later embedment of the edge 21 (and potentially further portions of the second object 2) in the thermoplastic material. The pretension is generated by providing a first object 1 including a distal end with an extension along an axis perpendicular to the axis along which the first object 1 is pushed through the perforation 20 that is larger than a diameter d of the perforation 20. Further, a second object 2 is provided including a region around the perforation 20 that is equipped to deform elastically in a manner that the diameter d increases due to a force acting on the region.

FIG. 3a shows the starting position, i.e., the first object 1 is positioned relative to the second object 2 in a manner that a distal end of the first object 1 is in contact with the region around the perforation 20. The region includes the edge 21 and is capable to relocate due to an elastical deformation. However, it is not required that the region is elastically deformable by itself. The second object 2 can include an elastically deformable area connecting the region to another portion the second object 2, for example.

In the embodiment shown, the region around the perforation 20 corresponds to the protruding section 23, wherein the protruding section 23 protrudes away from the side from which the first object 1 is provided.

However, it is not a requirement that the region protrudes from the sheet plane 23. One can also envisage a region around the perforation 20 that is parallel to the sheet plane 23, in particular in the sheet plane 23.

In a first step, the distal end of the first object 1 is pressed through the perforation 20 by applying a pressure force (indicated by the straight arrow in FIG. 3a) to the first object.

During the first step, there is no rotational movement of the first object 1 relative to the second object 2 or at least no rotational movement that may cause the creation of a melting zone.

In other words, a rotational movement of the first object 1 relative to the second object 2 for pressing the first object 1 into the second object 2, for example a rotational movement as applied to a screw, can be applied to the first object 1. However, this is not a rotational movement in the sense of the invention, in which the rotational movement generates friction heat such that at least a portion of the thermoplastic material becomes flowable.

FIG. 3b shows the situation after the distal end of the first object 1 has been pushed through the perforation 20 and immediately prior to the second step in which the first object 1 is brought to a rotational movement relative to the second object 2 such that the melting zone 13 is formed. Hence, the thermoplastic material is in its solid state and the lateral side of the first object 1 prevents the region around the perforation to go back to its initial state. The region around the perforation 20 is pretensioned and a pressing force (indicated by the horizontal straight arrows in FIG. 3b) is generated between the edge 21 and the thermoplastic material.

FIG. 3c shows the situation after bringing the first object 1 to the rotational movement relative to the second object 2.

The rotational movement in combination with the pressing force generated by the pretensioned region formed the melting zone 13 into which the edge 21 was pressed due to the pressing force. The resulting positive-fit connection between the first and second object is shown in FIG. 3c.

Figure 4A:
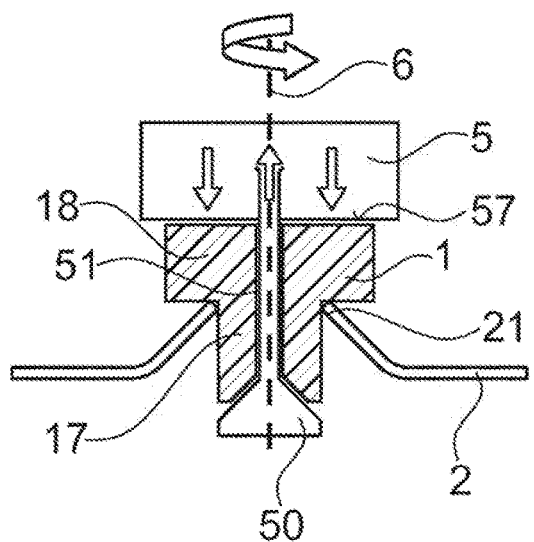
FIGS. 4a and 4b an embodiment including a counterelement capable for generating a compression force to the first object.
Figure 4B:
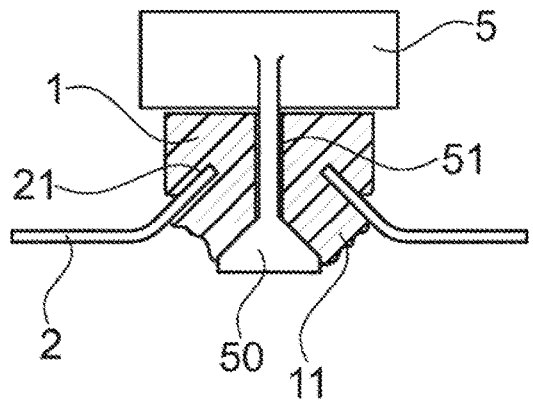

FIGS. 4a and 4b show an embodiment of the method, wherein a tool 5 including a counterelement 50 is provided. The counterelement 50 can be pulled towards the coupling-out face 57 (indicated by the upward directed arrow). Hence, the tool 5 is equipped to generate a compression force to the first object 1 positioned between the coupling-out face 57 and the counterelement 50.

In the embodiment shown, the first object 1 includes the head portion 18 and the protrusion 17, again. The protrusion is dimensioned such that it can be pushed through the perforation 20 in a solid state and without deforming elastically the region around the perforation 20.

In the embodiment shown, the first object 1 includes a through bore 51 via which the counterelement 50 is connected to the proximal side of first object 1, i.e., to the side on which a user performs the actions needed to carry out the method. In particular, the counterelement is connected to the tool 5.

FIG. 4a shows the situation immediately before the step of bringing the first object 1 to the rotational movement relative to the second object and applying the compression force by applying a pushing force (indicated by the downward directed arrows) to the coupling-in face 7 of the first object 1 and the pulling force (indicated by the upward directed arrow) to the counterelement.

The rotational movement in combination with the pulling force applied generates the melting zone 13 at a distal surface of the head portion 18.

The compression of the first object 1 causes a hydrostatic pressure on flowable thermoplastic material that is on the distal side of the edge 21. The hydrostatic pressure causes a flow of the flowable thermoplastic material that is directed radially outwardly with respect to the first object axis 14.

In the embodiment shown, the first object axis 14 coincide with the rotation axis 6 and the axis along which the protrusion 17 is pushed through the perforation 20.

The counterelement 50 can perform the same rotational movement relative to the second object 2 as the first object 1 does. This means, the counterelement 50 does not perform a rotational movement relative to the first object 1 and there is no melting zone generated at the interface between first object 1 and counterelement 50.

However, one can also envisage to let first object 1 rotate relative to the counterelement 50, too. In this case, there can be an additional melting zone 14 at the interface between first object 1 and counterelement 50. This additional melting zone 14 can improve the embedment of the edge 21 in the thermoplastic material, further.

The embodiment of the method including the counterelement 50 effects a better embedment of the edge in the thermoplastic material. In particular, the distal embedding of the edge 21 and the sheet portion around the edge is improved (as mentioned above in relation to the shell structure/anvil) is improved. FIG. 4b shows the first object 1 mechanically secured to the second object 2 by the method including a counterelement 50.

The counterelement 50 can be removed to the distal or proximal side or it can become a part of the assembly and serve as a fixation element for a further object, for example.

For removing the counterelement 50 to the proximal side, the counterelement 50 must have a radial extension that is smaller than a corresponding radial extension of the perforation 20 and that is larger than a corresponding radial extension of the through bore 51 in a manner that the counterelement 50 can be pulled towards the proximal side and thereby removed, wherein the movement of the counterelement 50 towards the proximal side presses liquefied thermoplastic material radially outwards.

In particular, the counterelement 50 can have a radial extension that corresponds 60-80% of the corresponding radial extension of the perforation 20.

If the counterelement 50 becomes a part of the assembly, it can be supported by a distal surface of the second object, for example by a distal face sheet 26, or it can be connected to the first object 1, for example by including structures, such as pores, voids and/or surface roughness, that allow the inflow of thermoplastic material that is liquefied during the method of securing the first object 1 to the second object 2.

In particular, the method can include the further step of connecting the counterelement 50 to the first object 1. This step can include a rotational movement of the first object 1 relative to the counterelement 50 as described above.

Figure 5A:
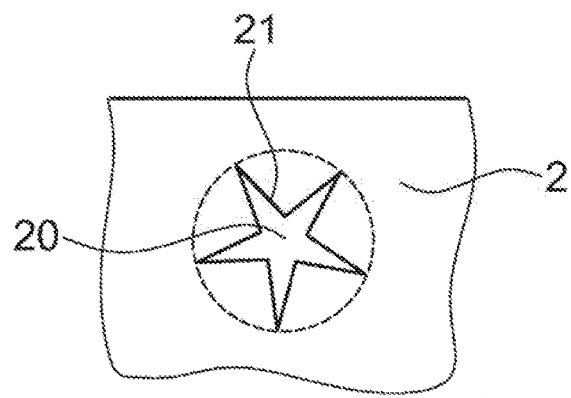
FIGS. 5a and 5b an embodiment of a second object with a securing location.
Figure 5B:
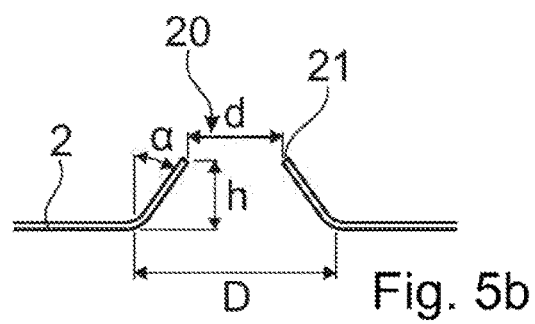

FIGS. 5a and 5b show, in a top view and in cross section, an example of a metal sheet 2 being the second object. The metal sheet includes the perforation 20, for example made by a punching tool. For example, the perforation 20 may be made by slowly pressing a tool with a tip against the metal sheet while the same is placed against a support with an opening at the place where the tool acts, until the tip of the tool comes through. The shape of the perforation 20 will be irregular, with a plurality of tongues. Alternatively, the shape could be regular if a corresponding geometry had been punched or cut (by a water jet or laser) before or been shaped in a prior sheet forming process. Around the perforation 20, the metal sheet forms the edge 21.

The edge 21 has the function of an energy director in the subsequent steps.

The parameters height h, (average) diameter d of the perforation, diameter D of the d section that is deformed to project away from the metal sheet plane and—in some situations better defined than the diameter d of the perforation—the angle $\alpha$, here defined as the angle between the deformed section and the vertical to the metal sheet plane—are depicted in FIG. 5b.

A protruding section 22 including tongues has the advantage that larger heights h, smaller angles $\alpha$ and/or smaller D/d-ratios compared to protruding sections without tongues and gaps separating the tongues can be realized. Further, a sheet portion including an undercut structure, for example formed by laser cutting, can be used for an additional extension of the parameter range without effecting the pull-out resistance adversely.

For example, a D/d-ratio close to 1 can be realized.

However, the use of the method including the rotational movement and hence working efficiently without need for applying high pressure (for example compared to methods that base predominantly on axial, for example vibrational axial, movements) on the protruding section 22 allows for small angles α, large D/d-ratios and/or large heights h.

In other words, the dimension of the protruding section can vary in a wide range compared to methods that base predominantly on axial, for example vibrational axial, movements.

Figure 6A:
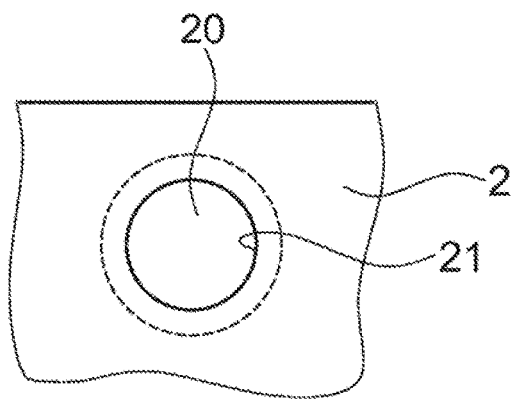
FIGS. 6a and 6b an alternative embodiment of a second object.
Figure 6B:
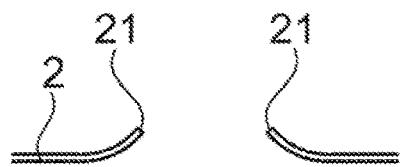

As an alternative to being perforated irregularly, by means of a suitable punching device in combination with pre-cutting the central hole geometry (e.g., by laser) one can also manufacture an irregular or regular, for example circular perforation 20 as shown in FIGS. 6a and 6b.

Depending on the bond to be formed between the first and second object and—as the case may be—a third object, the metal sheet that constitutes the second object around the perforation can project towards the first object or away from the first object 1.

In embodiments of the second object 2 as shown in FIGS. 5a, 5b, 6a and 6b, the dimensions of the perforation/deformed section 22 on the one hand and of a projecting portion of the first object 1 are adapted to each other in a manner that there is substantial resistance against a forward (distal) movement of the first object 1 with respect to the second object 2 when the projecting portion of the first object 1 is inserted in the perforation 20.

FIGS. 7 and 8 show in a top view another example of second objects 2 and their securing location formed by a non-circular edge 21. Such securing location are used preferably in combination with a relative rotational movement between the first and second object that includes an orbital movement.

A non-circular edge 21, as shown in FIGS. 7 and 8, can cause problems when used in combination with other relative movements (i.e., movements not including an orbital movement) between the first and second object, e.g., a rotational movement with constant direction of rotation, or it can result in a more demanding step of positioning the first object 1 relative to the second object 2, for example due to a needed specific orientation of the two objects relative to each other when used in combination with a relative movement not including the orbital movement, e.g., an oscillating rotational or translatory movement.

In FIG. 7, the edge 21 has the shape of a dodecagon.

In FIG. 8, the edge 21 has an elliptical ("oval") shape.

FIG. 9 shows an exemplary embodiment of a connector 30.

The connector includes an attachment location 31. The attachment location 31 includes thermoplastic material and is arranged to get in contact with the edge 21 of the second object 2 during a step of positioning the connector 30 relative to the second object 2.

The connector 31 further includes a fastening structure 35. In the embodiment shown, the fastening structure 35 is a bore including a thread.

Generally, the connector 30 corresponds to the first object 1 and can include further any one of the features of the first object 1 alone or in combination with one or several other feature(s) of the first object 1.

It is not a requirement that the attachment location 31 is a location of the connector 30 that differs in its material composition from a connector body or from the connector 30 as a whole.

The connector body can be formed by a head portion 18 and a protrusion 17 (as discussed with respect to the first object 1), for example.

FIG. 10 shows an embodiment of the connector 30, wherein the attachment location 31 is an integral part of the connector that does not differ in the material composition from the connector. This means that the attachment location 31 is defined by the area that gets in contact with the edge 21 during the step of positioning the connector 30 relative to the second object 2 and during the step of bringing the connector 30 to the relative movement to the second object 2.

In the embodiment shown in FIG. 10, the fastening structure 35 includes an element of a snap lock.

Different from the embodiment shown, the fastening structure 35 can be an integral part of the connector 30.

In particular, the connector 30 can be produced, for example by injection moulding, in one piece, i.e., without gluing or bonding the fastening structure 35 and/or attachment location 31 to the connector body.

The method according to any embodiment of the invention is suitable for securing a third object 60 to the first and second objects 1, 2 or to one of the first and second objects by means of the other one of the first and second objects.

In a group of embodiments the first object serves as connector for securing a third object to the second object, especially in situations where the third object like the second object has a flat portion and where the assembly of the second and third objects is accessible only from one side. For example, the second and third objects may be metal objects, or fiber composite objects, or one of them may be a fiber composite object and the other one a metal object. Especially, the second and third objects may be of different materials having substantially different coefficients of thermal expansion a.

According to the prior art, such connections were primarily achieved by blind rivets or by gluing. Blind rivets are technically rather complex. Further, both, blind rivets and glue connections feature the substantial disadvantage that they have a very limited suitability to compensate for shear loads that arise if the objects connected react differently to temperature changes due to different coefficients of thermal expansion. For example, the coefficient of thermal expansion of Aluminium is $\alpha_{Al}=2*10^{-5}$K, whereas the coefficient of thermal expansion of a typical CFK (carbon fiber reinforced composite) may even have the opposite sign: $\alpha_{CFK}=-5*10^{-6}$ K. For example, in industrial manufacturing processes sub-assemblies after the assembly process often undergo a cathodic electrodeposition (or other immersion bath) process, which will take place at an elevated temperature of for example about 180° C. For this reason, in industrial manufacturing, objects that after being assembled with each other are subject to an electrodeposition process will in addition to be bonded by an adhesive connection also be secured to each other by a (blind) rivet. When subject to temperature changes, for example during the electrodeposition process (if applicable) or during use in varying environmental conditions, this will lead to deformation around the rivet connection, and hence to permanent internal stress and/or bearing stress, depending on the set-up also to delamination, etc.

The approach according to the present invention provides a solution to this problem.

Figure 11A:
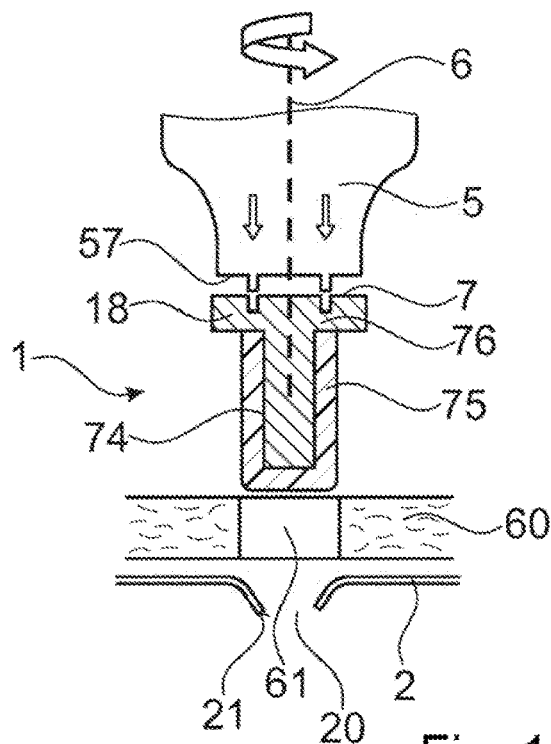
FIGS. 11a and 11b a configuration in which a third object is secured to the second object by the first object in an initial and a final stage, respectively.
Figure 11B:
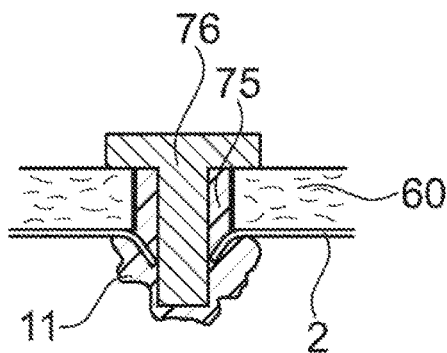

FIGS. 11a and 11b show an exemplary configuration in which the third object 60 is secured to the second object 2 by the first object 1. FIG. 11a shows an initial stage and FIG. 11b shows a final stage, respectively.

The first object 1 in FIG. 11a serves as a connector for securing the third object 60 to the second object 2. The first object 1 has a portion 75 of the thermoplastic material as well as a reinforcer portion 76 being a non-liquefiable core portion, for example of a metal. The core portion 76 forms the head portion 18 of the first object 1 and runs in an interior of a shaft portion 74. In the depicted configuration, the core portion 76 is coated by the thermoplastic material portion 75 along the entire shaft, however, it would be possible to provide the thermoplastic material portion only as partial coating, for example leaving the distal end of the core portion 76 free of any coating or leaving certain sections around the periphery free of any coating.

The third object 60 has a third object opening 61 being a through opening.

The metal sheet that constitutes the second object 2 around the perforation 20 has a section that projects away from the first object 1. Especially, the second object 2 may be formed as shown in FIGS. 5a and 5b, but upside-down, so that it has a plurality of tongues between which the thermoplastic material may flow.

The diameter (compare FIG. 5b) of the perforation 20 is smaller than the diameter of the third object opening. More in particular, the cross section of the shaft portion 74 is such that it fits through the opening but does not fit through the perforation.

After the first object 1 has been inserted through the opening, it is pressed against the distal direction, in particular against the second object 2, by the tool 5 by which at the same time the rotational movement is coupled into the first object 1, such that thermoplastic material becomes flowable. The process is continued until the head portion 18 causes the advance movement (movement into the distal direction) of the first object 1 to stop. Then, the excitation causing the rotational movement is stopped and the tool is removed.

FIG. 11b shows the result with the material portions 11 having flown to distally of the second object 2 forming a blind rivet-like foot portion. Thus, in the configuration of FIG. 11b, the first object after the process forms a rivet, with the second and third objects being clamped between this foot portion and the head portion 18.

The thermoplastic material used can have a glass transition temperature somewhere between room temperature and about 160° C. so that the rivet connection has the hereinbefore-discussed advantages in terms of compensating for different coefficients of thermal expansion in an electrodeposition process, for example of a painting/lacquer. As an example, acrylonitrile has a glass transition temperature of about 130° C.-140° C.

FIGS. 12 and 13 show exemplary configurations for securing the third object 60, the second object 2 and the first object 1 to each other.

FIG. 12 illustrates the principle that a third object 60 to be secured to the first and second objects 1, 2 (or to be secured to one of the first and second objects by means of the other one of the first and second objects) may be connected to the first object 1 by an additional positive-fit connection between the first and third objects.

To this end, the third object 60 includes a structure that includes undercuts with respect to at least one direction (the axial direction in FIG. 12) into which thermoplastic material of the first object 1 may flow. In the embodiment of FIG. 12, the structure is provide on a protrusion 62 of the third object 60 which during the process is pressed into material of the first object 1 while the first object 1 is set in the relative movement that includes the rotational movement with respect to the second and third objects. The objects are placed relative to one another so that the portion of the second object around the perforation 20 is between the first and third objects and the protrusion 62 reaches through the perforation 20 of the second object 2 during the process and thereby comes into contact with the first object 1.

A further feature of the embodiment of FIG. 12, which is independent of the shape of the third object 60 that includes the protrusion with the positive-fit structure, is that the third object 60 is placed on the same side of the first object 1 as the second object 2. The step of bringing the first object 1 in rotational movement and compressing the assembly including the first, second and third objects by applying the mechanical pressing force, the step resulting in embedding the edge of the second object 2 and parts of the third object 60 (here: of the protrusion), will thus cause a backflow of thermoplastic material towards the side of the second and third objects, whereby the space between the protrusion 62 and the sheet portion will be at least partially filled.

Also, in configurations like the one of FIG. 12, the process will result in the second object 2 being clamped between the first and third objects.

FIG. 13 depicts a variant of the embodiment of FIG. 12, in which a positive-fit connection between the first and third objects includes causing material of the third object 60 to penetrate into an undercut structure 73 of the first object 1. To this end, the third object 60 may include, at least in a region of the protrusion 62, thermoplastic material that becomes flowable by the impact of the rotational movement and the pressing force. The thermoplastic material of the third object 60 in such embodiments may be of a same composition as the one of the first object 1, or it may be different.

The dimensions of the undercut structure 73 and of the protrusion 62 can be such that tolerances of the objects to be secured to each other can be compensated, for example by allowing for a given range in which the objects can be positioned relative to each other.

Independent of the embodiment of the method or the design of the first, second and—as the case may be—the third object, one can envisage to design the objects to be secured in a manner that the objects allow for relative positioning in a range sufficient for compensating tolerances.

Depending on the material pairing of the thermoplastic materials of the first and third objects, in such embodiments also a weld may result between these objects, with or without an undercut structure being present in one of the objects.

In embodiments, the method includes providing the second object 2 with a plurality of attachment locations, each attachment location including an edge of the sheet portion, and coupling, for each attachment location, an excitation causing the relative rotational movement of at least one object of the assembly into the assembly until a flow portion of the thermoplastic material due to friction heat generated between the edge and the thermoplastic material becomes flowable and flows around the edge to at least partially embed the edge in the thermoplastic material. This may be done simultaneously for all attachment location or for subgroups of attachment locations, or may be done sequentially for the attachment locations. Each attachment location can be of any embodiment shown, in particular of any embodiment shown in FIGS. 1-8 and 11-19. Each attachment location may for example include a perforation 20 of the kind described hereinbefore, with the edge running along the perforation. In such an embodiment, the assembly includes the first and second object and—as the case may by—further objects, in particular the third object.

Figure 14:
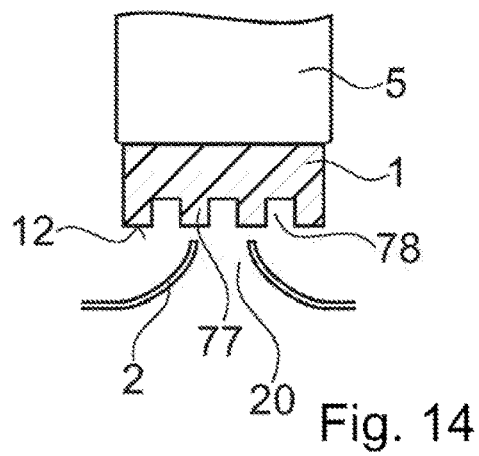
FIG. 14-17 configurations implementing the principle of providing the contact side of the first object with structures.

FIG. 14 shows an arrangement of a first object 1, a second object 2, and a tool 5 positioned proximally of the first object 1. The first object 1 on a contact side 12 (distal side/face in the shown arrangement) has a pattern of protrusions 77 and, between the protrusions, indentations 78. Thereby, the flow portion of the thermoplastic material that flows relative to the second object 2 during the process has a space to flow to. This is in contrast to embodiments without the structure on the contact side 12, where excess material displaced by the second object 2 has to be squeezed out either through the perforation 20 or sideways or has to flow back towards the first object 1 against the pressing direction, in which case the forces and excitation to be applied need to be higher.

Figure 15:
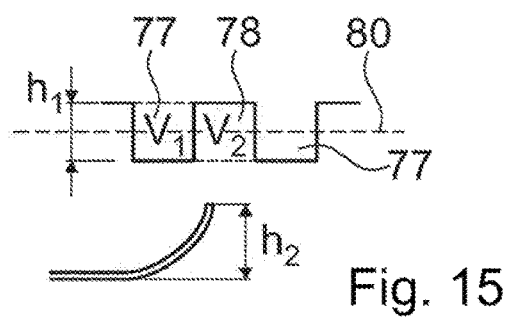

As shown in more detail in FIG. 15, the following possible design criteria may apply:

The overall volume $V_1$ of the protrusions 77 may be approximately equal to the overall volume $V_2$ of the indentations 78, i.e., the middle plane 80 of the contact side surface may be at approximately equal distances from the peaks and valleys of the protrusions and indentations, respectively.

The depth $h_1$ of the indentations 78 may be smaller than the height $h_2$ of the protruding section. This design criterion especially applies of the connection between the first and second object has to be sealing.

These criteria are independent of each other.

Figure 16:
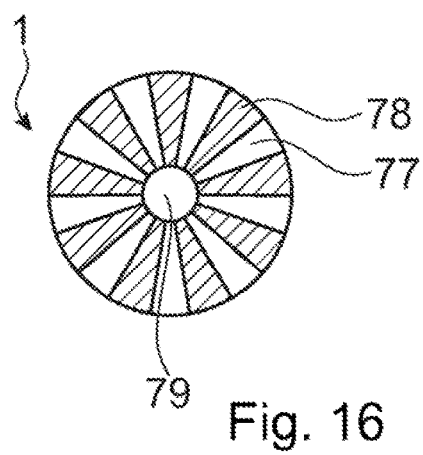
Figure 17:
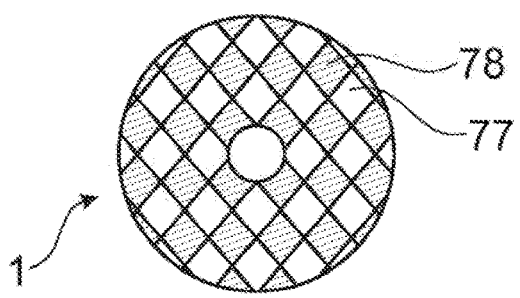

FIGS. 16 and 17, schematically showing views of the first object from the contact side 12, show possible patterns of indentations/protrusions. The radial pattern of FIG. 16 includes indentations 78 and protrusions 77 that run radially from a central portion 79, which central portion in the process is aligned with the perforation 20 of the second object 2 and has a smaller diameter than the latter.

FIG. 17 illustrates a chess board like pattern.

In an embodiment, the method includes the step of providing an anvil 600 against which a protrusion of the first object 1, the protrusion being pushed through the perforation 20, is pressed during the step of bringing the first object 1 and the second object 2 to a relative rotational movement to each other.

In particular, the first object 1 is brought in a rotational movement with respect to the anvil 600 such that thermoplastic material of the protrusion becomes flowable where in contact with the anvil 600, too.

FIGS. 18, 19*a* and 19*b* show two configurations with an anvil 600.

In the configurations shown, the first object 1 includes an opening 611 into which a connector piece can be advanced in a step subsequent to securing the first object 1 to the second object 2, for example. The opening 611 can be a through opening or it can be terminated by a bottom portion 612, in particular by a bottom portion 612 so that the first object 1 (as previously described) can provide a sealing that seals the proximal side of the second object 2 from the distal side thereof.

Alternatively, in embodiments including a step of providing the connector piece and a step of advancing it into the opening 611 of the first object 1, the connector piece could itself be such that the opening 611 is not a through opening but a blind opening after advancing the connector piece into the opening.

In the embodiments shown, the opening 611 runs partly in a distally extending portion 610 of the first object 1.

In the embodiment shown in FIG. 18, the anvil 600 includes radially-inwardly of the edge 21 (referring to a center of the perforation 20) a directing protrusion 601 that directs material flow distally of the second object edge towards radially outwardly into an annular receiving depression 602. The anvil 600 includes a recess for accommodating the extending portion 610 that extends into the perforation 20 and includes the opening 611.

The tool 5 shown in FIG. 18 includes a guiding protrusion 56 cooperating with the opening 611 to guide the tool.

FIGS. 19*a* and 19*b* show another embodiment including an anvil 600 (the tool 5 is not shown in FIGS. 19*a* and 19*b*). FIG. 19*a* shows an initial stage and FIG. 19*b* shows a final stage, respectively.

Similarly to the embodiment of FIG. 18, an anvil 600 is used to direct material flow, and the anvil 600 has a recess (which could alternatively to the shown embodiment be a through opening) for accommodating the extending portion 610.

A possible principle of any embodiments that include an anvil 600 is also illustrated in FIGS. 19*a* and 19*b*. A volume of the receiving indentation 602 (below the dashed line in FIG. 19*a*) may be chosen to be somewhat smaller than a volume of the thermoplastic material portion available for flowing. In FIG. 19*a*, this available material portion corresponds to the volume of an annular protrusion 605 of the first object 1. If the volume of the receiving structure of the anvil 600 is smaller than the available volume of the thermoplastic material, by applying a pressing force between the first object 1 on the one hand and the second object 2 and anvil 600 on the other hand a beneficial shaping pressure may be achieved.

Figure 20A:
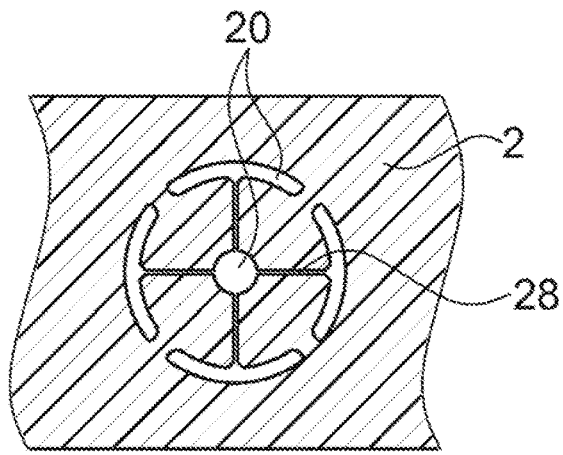
FIGS. 20a and 20b a further exemplary embodiment of the second object after cutting the perforation (FIG. 20a) and after bending the cut sheet portion (FIG. 20b)

FIG. 20*a* shows a further exemplary embodiment of the second object 2 including a perforation 20 that has been cut into the sheet portion. Perforations 20 of the kind shown in FIG. 20*a* can be realized by laser cutting, for example.

The cut structure is such that it can be deformed into the protruding section 22 and that it forms an undercut 29 with respect to the normal of the sheet plane 23 after forming the protruding section 22.

The cut structure includes sections (four sections in the embodiment shown) that are separated by a gap 28 from each other. This allows for an independent deformation of each section leading to the tongues discussed above. Further, it increases the range of possible angles in principle to 0-180 degrees, in particular to 0-90 degrees.

Figure 20B:
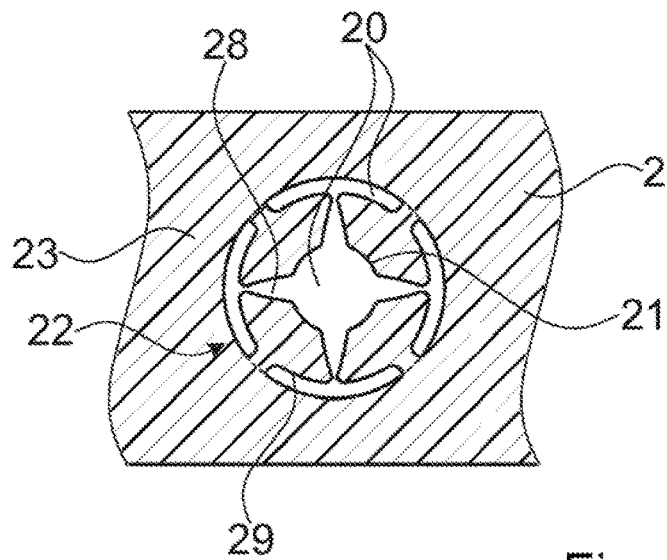

FIG. 20*b* shows the second object 2 according to FIG. 20*a* after bending the cut structure, this means after forming the protruding section 22.

The cut structure forms now the undercut 29 with respect to the axis along which the cut structure has been bent. Further, each section cut into the second object 2 forms a tongue.

In the embodiment shown, each of the tongues form an undercut 29 that is given by a lateral extension that varies in dependence of the distance from the sheet plane 23. There is no need that each tongue includes an undercut 29 or that the tongue(s) form one undercut, only. Rather, the number of tongues including an undercut 29 and the number of undercuts 29 per tongue and in total can be designed in a case dependent manner.

The gap 28 has widened. If an oscillating rotational movement is used in the method, an amplitude of the oscillating rotational movement that is smaller than the widened gap can be advantageous.

In the embodiment shown in FIGS. 20*a* and 20*b*, the undercuts are formed at the foot of the tongues, this means in the region where the sections are bent (indicated by dashed line). However, one can envisage other locations of the undercut 29.

Figure 21:
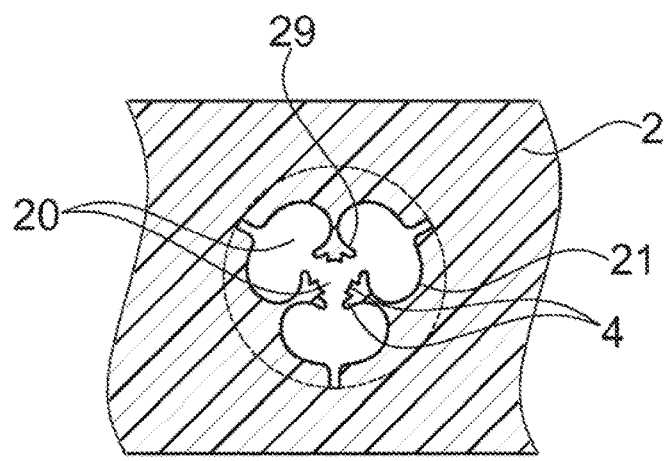
FIG. 21 yet a further exemplary embodiment of the second object after cutting the perforation.

FIG. 21 shows an embodiment of the second object 2 including a cut perforation 20 that will lead to an undercut 29 after forming the protruding section 22, the undercut 29 being located closer to the top of the tongue compared to the undercut shown in FIG. 20b.

The second object 2 according to FIG. 21 further shows the optional feature of an energy director 4. The use of an energy director 4 is not restricted to the second object shown in FIG. 21. Rather, it can be part of any embodiment of the first, second and third object disclosed.

What is claimed is:

1. A method of mechanically securing a first object to a second object, the method comprising the steps of:
    providing the first object, wherein the first object comprises thermoplastic material in a solid state,
    providing the second object with a generally flat sheet portion having an edge, wherein the sheet portion defines a sheet plane and has a projecting section projecting away from the sheet plane, the projecting section comprising the edge,
    positioning the first object relative to the second object to provide an assembly comprising the first and second object, in which assembly the projecting section projects towards the first object and the edge is in contact with the thermoplastic material,
    while the edge is in contact with the thermoplastic material, bringing the first object and the second object to a relative movement to each other such that a melting zone comprising flowable thermoplastic material is formed due to friction heat generated between the edge and the thermoplastic material and such that thermoplastic material of the melting zone flows around the edge to at least partially embed the edge in the thermoplastic material,
    stopping the relative movement and letting the thermoplastic material resolidify to yield a positive-fit connection between the first and the second object,
    wherein the relative movement comprises a rotational movement;
    wherein in the step of providing the second object, the second object comprises a perforation, with the edge running along the perforation;
    wherein in the step of providing the first object, the first object extends along a first object axis between a proximal surface and a distal surface and comprises a protrusion protruding distally from the distal surface of the first object; and
    wherein the method comprises a step of pushing at least a portion of the protrusion into the perforation such that the edge is in contact with at least one of a portion of a surface of the protrusion that is arranged parallel to the first object axis and a portion of the distal surface of the first object.

2. The method according to claim 1, wherein the rotational movement comprises a rotational movement around a rotation axis, wherein the rotational movement has a constant direction of rotation.

3. The method according to claim 1, wherein the rotational movement comprises a rotational movement around a rotation axis, wherein the rotational movement is a back and forth oscillating rotation around the rotation axis.

4. The method according to claim 1, wherein the rotational movement comprises an orbital movement.

5. The method according to claim 4, wherein a cross-section of the perforation normal to a rotation axis of the first or second object or normal to a longitudinal axis of the perforation has a non-circular shape.

6. The method according to claim 1, wherein at least one of the first object and the second object comprises a coupling-in face, wherein the method comprises the step of providing a tool comprising a coupling-out face, wherein the coupling-out face is arranged to engage with the coupling-in face, and wherein the tool is equipped to generate an excitation capable to set an object engaged to the tool by the coupling-out face in the rotational movement.

7. The method according to claim 1, further comprising a step of expanding radially the portion of the protrusion that is pushed or has been pushed into the perforation in the step of pushing the protrusion into the perforation such that the radially expanded protrusion expands beyond the edge of the perforation.

8. The method according to claim 7, comprising at least one of:
    a step of spinning the first object such that flowable thermoplastic material expands radially due to centrifugal force;
    in the step of providing the second object, the second object comprises a distal surface and wherein the method comprises a step of bringing a distal portion of the first object in contact with a rear side of the distal surface of the second object and a step of deforming said distal portion of the first object;
    a step of providing a tool, comprising
        a counterelement arranged or arrangable distally of the first object, wherein the counterelement can be moved along the first object axis in a proximal direction by applying a pushing force to the counterelement, and comprising
        a coupling-out face arranged or arrangable at the proximal surface of the first object, wherein a pressing force can be applied to the first object via the coupling-out face,
    wherein the counterelement and the coupling-out face are arranged such that a compression force can be applied to the first object, and wherein the first object is compressed during the step of bringing the first object and the second object to a relative movement to each other.

9. The method according to claim 1, wherein a region around the edge is pretensioned such that the edge penetrates into the flowable thermoplastic material formed during the step of bringing the first object to a relative movement to the second object.

10. The method according to claim 9, wherein:
    a diameter of the protrusion is larger than a diameter of the perforation, and
    the step of pushing the protrusion into the perforation is carried out prior to the step of bringing the first object and the second object to a relative movement to each other,
    such that the pretension is generated in the region around the edge during the step of pushing.

11. The method according to claim 1, wherein the distal surface of the first object is flat, and wherein in the step of positioning, the flat distal surface of the first object is brought into physical contact with the edge.

12. The method according to claim 11, wherein in the step of positioning, the flat distal surface of the first object is caused to lie parallel to the sheet plane and in the step of bringing the first object and the second object to a relative movement to each other, the flat distal surface of the first object is caused to approach the sheet plane.

* * * * *